(12) United States Patent
Sorensen (10) Patent No.: US 7,065,828 B2
(45) Date of Patent: Jun. 27, 2006

(54) CASTER ASSEMBLY WITH DRAWN KINGPIN RIVET

(76) Inventor: Mark C. Sorensen, 2487 Spring St., Unit 3, Redwood City, CA (US) 94063

( * ) Notice: Subject to any disclaimer, the term of this patent is extended or adjusted under 35 U.S.C. 154(b) by 0 days.

(21) Appl. No.: 10/408,772

(22) Filed: Apr. 7, 2003

(65) Prior Publication Data

US 2004/0194252 A1    Oct. 7, 2004

(51) Int. Cl.
*A47B 91/00* (2006.01)
*A60B 33/00* (2006.01)

(52) U.S. Cl. ............................... 16/45; 16/21
(58) Field of Classification Search ............ 16/45, 16/48, 43, 20, 21, 38, 39, 31 R, 31 A; 280/47.38, 280/642, 647, 650; 180/1.12; 301/111.01, 301/111.05, 111.06, 111.07
See application file for complete search history.

(56) References Cited

U.S. PATENT DOCUMENTS

| | | | | |
|---|---|---|---|---|
| 716,341 A | * | 12/1902 | Livingstone | 16/43 |
| 2,787,804 A | * | 4/1957 | Noelting et al. | 16/21 |
| 2,944,280 A | * | 7/1960 | Black | 16/21 |
| 3,213,483 A | * | 10/1965 | Hayes et al. | 16/21 |
| 3,571,842 A | * | 3/1971 | Fricke | 16/35 R |
| 3,947,917 A | * | 4/1976 | Schwartzstein et al. | 16/30 |
| 4,038,717 A | * | 8/1977 | Greathouse | 16/29 |
| 4,219,903 A | * | 9/1980 | Black | 16/21 |
| 4,332,052 A | * | 6/1982 | Remington | 16/30 |
| 4,707,880 A | * | 11/1987 | Doyle et al. | 16/38 |
| 4,805,260 A | * | 2/1989 | Tooth | 16/37 |
| 5,461,753 A | * | 10/1995 | Rounds | 16/21 |

FOREIGN PATENT DOCUMENTS

| CA | 1271143 A | * | 7/1990 |
|---|---|---|---|
| JP | 05270204 A | * | 10/1993 |

* cited by examiner

*Primary Examiner*—Chuck Y. Mah
(74) *Attorney, Agent, or Firm*—Jill L. Robinson (57) ABSTRACT

A caster assembly including a unique drawn kingpin rivet formed of stainless steel or other material of appropriate toughness which compressively holds the components of the caster assembly together.

12 Claims, 9 Drawing Sheets

CASTER ASSEMBLY WITH DRAWN KINGPIN RIVET

BACKGROUND OF THE INVENTION

Casters, which generally comprise a wheel or the like swivel-mounted on a chassis, are used in many industrial applications. They can be ordered with different configurations, sizes, materials, and load capacities. This invention relates a caster assembly held together by a drawn kingpin rivet. The assembly exhibits several unique qualities, including the ability to passively absorb shock to a much greater extent than similar devices.

There are three general categories of casters: furniture, industrial, and specialty. Furniture casters are found on all types of office and household items. They are the cheap to produce, as they are largely constructed from injection molded plastic, but they suffer from a relatively low load capacity (<100 lbs.)

Industrial casters are generally manufactured by an economical stamping or cold forging process with secondary welding operations. They include light-duty casters, such as those found on shopping carts, to heavy-duty casters, such as those found on sophisticated manufacturing equipment. The price for industrial casters ranges from $2–3 for light-duty casters to well over $100 for heavy-duty casters.

As the name implies, specialty casters are designed for specific industrial applications and include super-heavy-duty casters (for loads greater than 2,000 lbs) and shock absorbing casters. Not surprisingly, specialty casters are usually significantly more expensive than standard industrial casters.

Industrial casters that include a mounting plate, which facilitates attachment to equipment, are usually constructed in one of three distinct ways that vary greatly in cost, quality, and durability. The cheapest and most widespread construction has stamped or cold forged sheet metal parts held together by a kingpin rivet. The sheet metal parts are typically produced from a low carbon steel, such as hot roll strip, that is inexpensive and easy to form due to its high ductility. However, low carbon steel can tolerate very little strain prior to yield and has a low toughness in addition to other poor mechanical properties. Accordingly, in medium to heavy-duty applications, caster parts produced from this material tend to be very thick and heavy, and the low rate of work-hardening results in a surface hardness that is insufficient to handle significant bearing loads. Casters of a higher quality using this construction will therefore case harden the parts that come into contact with the hardened ball bearings to prolong the life of the bearing surfaces and increase the overall structural rigidity of the caster. Case hardening encases the part with a thin martensitic layer of steel that is much harder than the internal steel matrix. The depth of this layer is referred to as the case depth. The case-hardened parts are subsequently rack-plated with a bright zinc finish or even a chrome finish to prevent atmospheric oxidation.

The kingpin rivet that holds these parts together is typically an elongated cylindrical part with a wider head portion. Such a kingpin can be inexpensively mass-produced from a mild steel by a screw machining process or cold-headed much like the head of a conventional bolt. The kingpin rivet is inserted though a central aperture in all the parts and the end opposite the head is mechanically or hydraulically swaged outwards to permanently retain the assembly. The strength of the kingpin rivet increases dramatically as the diameter increases with typical diameters ranging from 7/16–3/4 of an inch.

Under extreme conditions, casters of any kind may exhibit various modes of failure. "Soft" modes of failure are the most common, and generally precede "hard" or catastrophic failure. Soft failure modes include brinelling of the raceways where the hardened steel ball bearings create small indentations in the metal, "flat spotting" of the wheels where the material creeps under an excessive load, or severe corrosion. None of the soft failure modes necessarily renders the caster assembly unusable as is the case with hard or catastrophic failure.

Industrial casters with kingpins and case hardened sheet metal parts serve the majority of industrial caster applications but are notorious for suffering catastrophic kingpin failure. During movement, all kingpins can be subjected to extreme degrees of stress as static and dynamic loads combine to form strong moments that act about them. Under these conditions, the portion of the kingpin opposite the wheels comes under the greatest stress particularly in the area where it has been swaged. Overstressing a swaged kingpin in this area may lead to a soft failure deformation of the metal, wherein the assembly is no longer bound tightly together, or an abrupt catastrophic failure. Over the years, manufacturers have strengthened kingpins and in some cases have replaced them altogether with a commercial grade nut and bolt that offers greater strength but adds more cost. In either case, this shifts the point of catastrophic failure to other parts in the assembly.

The second industrial caster construction utilizes a kingpin stud that is integrally hot-forged with the mounting plate and is generally reserved for the heaviest duty applications (2,000–20,000 lbs). Hot forged casters are manufactured from medium carbon steel that is heated to elevated temperatures and worked into shape by a forging press. The forged parts are extremely strong and include the mounting plate with the integral kingpin and upper race and a lower bearing raceway. A drawback of the hot forging process is that close tolerances cannot be held and smooth finishes cannot be controlled. This is critical for any bearing raceway or precision bearing bore. Therefore, subsequent machining operations must be performed which add considerable cost to the parts. After the machining process is completed, the ball bearing raceways are hardened to make them capable of handling the heaviest loads and welding operations are performed to affix the caster legs to the lower race. After powder coating them for good cosmetic appearance and corrosion resistance, the assembly is ready for final assembly. This is completed when a large king nut is tightened on the integral kingpin stud of the mounting plate. Hot-forged casters constructed in this fashion are far more expensive than sheet metal kingpin casters but are considered the most durable and robust construction.

The third construction eliminates the kingpin altogether and is commonly referred to as "kingpinless." Exactly how the kingpin is eliminated varies, but this construction generally combines cold forged parts with machined parts or hot-forged parts together in a welded assembly. One such implementation has a rectangular mounting plate welded to a tubular inner race that has a single ball-bearing groove machined about the outside diameter. The outer raceway has an inside diameter slightly larger than the outside diameter of the inner race and has a complementary bearing groove machined into its inner diameter. On the top end, the outer race is spaced to clearance the mounting plate and the caster legs are welded to the bottom end. The unit is assembled by aligning the inner and outer raceways and then inserting the hardened ball bearings through an access hole drilled in the outer race. This hole is subsequently plugged or sealed with a welding operation. The resulting caster assembly is superior in strength and durability to a comparable kingpin caster because the assembly is retained about a much larger diameter by the hardened ball bearings and raceways. However, the machined parts and extra assembly required adds considerably to the cost of the unit.

These three industrial caster constructions are designed for general material handing applications and offer very little in the way of shock absorption. When casters do encounter obstacles in the course of ordinary duty, most of the shock is transmitted directly through to the supported equipment. These shock loads also substantially and momentarily increase the load upon the caster. For reference, this dynamic load can easily be twice the static load and a typical duration of this load may be 30 milliseconds. It is not surprising then that most casters experience soft failure bearing damage or catastrophic failure under these service conditions.

Most caster manufacturers offer specialty shock-absorbing casters that contain active elements for shock absorption that are not found on ordinary industrial casters for use in application where shock is an issue. The active elements may include compressible elastomer pads, die springs and the like that are selected to absorb shock over a particular range of loads. These casters are well-suited for use with sensitive electronic hardware and equipment, but they cost about four times more than an ordinary caster with similar load capacities. As a result, they are used only in applications where cost is not an issue or those where they are absolutely necessary.

At least one manufacturer offers an elastomer wheel with a unique circular pattern of geometrical cavities. This is an example of passive shock absorption where an existing caster part or component is modified for improved shock absorbing capability. Compared to active shock absorption, passive shock absorption generally does not perform as well but it is far less expensive.

As noted above, low carbon steel is the typical material for industrial casters. Stainless Steel industrial casters are available for corrosive service conditions or frequent washdown applications, but because stainless steel by weight costs five to six times as much as low carbon steel and it is difficult to machine, generally only stamped stainless casters with kingpin rivets are available commercially. Hot-forged stainless casters with integral kingpins do exist; however, they are extremely expensive. The vast majority of stamped stainless casters are currently made from an annealed 304 series stainless steel. In this condition, the material is about 20% stronger and considerably harder than the low carbon steel used in ordinary casters. The high nickel alloy (8–10%) content increases ductility for a high degree formability. Cold working low carbon steel and 304 stainless will both lead to increased strength and decreased ductility. However, for a given amount of cold work, the rate of work-hardening is far higher in the stainless steel. This property of metals to combine high strength with good ductility is a material property known as toughness.

As the material is formed into the shape of the caster parts, it is moderately work hardened to achieve a higher level of strength and hardness. Because 300 series austenitic stainless steels cannot be heat treated, the surface hardness of the bearing raceways is substantially less than that of case hardened low carbon steel parts. However, because strain hardening occurs throughout the parts as opposed to a limited case depth, the raceways can almost support as much as without bearing indentation. Finally, the complexity of the dies to manufacture stainless caster parts is considerably higher requiring a greater degree of expense and expertise. It should be noted that a die designed for stainless can also be used to run softer materials including low carbon steel. This is common practice in the industry so often the stainless parts are just as thick and heavy as the low carbon parts while costing much more.

BRIEF SUMMARY OF THE INVENTION

The present invention is a caster assembly that employs a unique combination of materials and geometry to arrive at a product that is durable, highly corrosion resistant, lightweight, and exhibits excellent passive shock absorbing qualities. All of the sheet metal parts can be efficiently stamped to arrive at an economical cost that is half that of stainless steel casters and very competitive with low carbon steel casters of reasonable quality. A unique drawn and curled kingpin rivet permanently retains the assembly. The end product is a caster assembly of exceptional quality and durability that can be tailored to handle anything from light to heavy-duty applications.

The caster assembly generally comprises an upper race, a lower race, a wheel chassis sandwiched between these parts, a thrust bearing assembly, and a proximally located drawn kingpin rivet for permanent retention. The upper race may be substantially circular and flat with a formed bearing groove that circumscribes the outer perimeter. Similarly, the lower race may have a flat inner portion and a drawn cylindrical portion circumscribed by a formed bearing groove. The thrust bearing assembly generally comprises an upper and lower set of ball bearings that reside in the raceway bearing grooves, a spacer and a shim for proper bearing spacing, and one or more o-ring seals that protect it from environmental contamination. The caster assembly may combine these and other elements to reliably aid in the movement of heavy equipment. Additionally, a mounting plate may be included to facilitate attachment to the supported equipment. The mounting plate may be a rectangular plate with mounting holes for screws and the like that attaches to a frame member of the unit. The mounting plate may also be a corner bracket for ease of attachment to the corners of equipment. Alternatively, the mounting plate may be eliminated altogether as the device may be attached to the equipment with a standard fastener that passes through the hollow center of the drawn kingpin rivet.

The upper race, the lower race, and the wheel chassis require a high surface hardness since they interface with the hardened steel ball bearings. These moving sheet metal parts may be manufactured from a 301 stainless steel in ¼ hard temper using a draw die in an industrial press. Stress relieved stainless steel in a ¼ hard temper has been *cold-rolled* beyond the annealed condition to become substantielly harder and *stronger. Compared* to the annealed stainless used in ordinary stainless *casters*, this material is about twice as strong and is C25 vs. B80 on the Rockwell hardness scale. As the parts are drawn into their finished shapes from flat strip coil, this material work hardens very quickly to achieve a condition that is even harder and stronger. This hardening is caused by strain hardening arid the partial transformation of austenite into low carbon martensite along the slip planes. The dies required to form tempered stainless are even more complex than ordinary stainless dies requiring close attention to detail and the highest level of tool and die expertise.

The superior properties of ¼ hard 301 stainless applied to the geometry of the caster moving parts permits the use of thinner sheet gauges without sacrificing strength. A reduction in thickness on the order of 40–50% is permissible and leads to a much lighter assembly. Additionally, the parts do not have to be zinc plated or case hardened because the stainless is much more corrosion resistant and the through hardness in the bearing contact areas approaches the case hardness of the low carbon steel. These powerful cost mitigating factors combined with an efficient manufacturing process leads to near cost parity with ordinary caster moving parts of reasonable quality made from low carbon steel.

Another property of tempered 301 stainless steel is its ability to withstand high amounts of strain prior to yielding. The more the material is work hardened, the more pronounced is this spring-like behavior as the yield stress increases and the modulus of elasticity decreases. Accordingly, caster moving parts made from this material have an inherent spring-like quality that can be harnessed to instantaneously store and release shock load energy. This is achieved by tailoring the part geometry in such a way as to allow localized deflections to occur under dynamic load conditions. For instance, the upper race, lower race, and the portion of the wheel chassis that interfaces with the lower bearings may have a radially cantilevered geometry that can be engineered for little or no deflection at the rated load while permitting more significant deflection under shock loads. This elastic behavior of the material over such a wide range of stress levels accommodates roughly ten times the deflection of low carbon steel and three times that of an annealed stainless. It is understood that the term radially cantilevered refers to a circular geometry that is constrained about a first radius and free to move about a second radius so that a cantilever length exists along any radial equal to the positive difference between these two radii.

Theoretically, the moving part deflections are displacement distributions that occur about an arc in response to sinusoidal bearing loads generated by the tremendous bending moment of the wheel offset. In relation to the upper race that experiences approximately 70% of the overall bearing load, the arc of deflection will extend across the back of the caster in an upwards direction and with a magnitude that symmetrically reaches a maximum at the most rearward point. The geometrical parameters that control the amount of deflection include the cantilever length, the part thickness, the bearing groove diameter, and the height of a circular lip that extends downwards from the outer perimeter. The cantilever length may be defined as the distance between the upper bearing radius and the radius of last constraint, in this case, the outer interface radius of the mounting plate. The variability of the three other parameters may be restricted by practical limitations. Respectively, these may include cost, a ball bearing size appropriate for the application, and the physical accommodation of the upper o-ring seal. In a preferred embodiment of the present invention, the upper race has a combination of parameters that permits a small deflection under the rated static load and a larger deflection under dynamic shock loads. To prevent yielding under extreme loads, the maximum deflection may be limited by the proximity of the lower mounting plate surface to the apex of the bearing groove. Alternatively, a thinner part geometry may be possible if the apex of the bearing groove was in contact with the mounting plate in the no load condition. The lack of deflection here would, however, diminish the capability of the caster assembly to absorb shock loads.

Similarly, the remaining bearing load is borne by the lower race together with the portion of the wheel chassis that cantilevers radially inwards. Here the arcs of deflection will extend across the front of the caster with the maximum deflection occurring at the most forward point. The interlocked portion of the lower race and wheel chassis will deflect in opposite directions with the lower race moving downwards and the cantilevered portion of the wheel chassis moving upwards. Variable geometrical parameters that most influence deflections in this area include the cantilever length and the thickness of the lower race. The cantilever length is the distance between the lower bearing radius and the radius of last constraint. This constraint is generally provided by the drawn kingpin rivet which may be directly or indirectly in contact with it. The thickness is proportional to the amount of deflection and must be sufficiently capable of withstanding high stress levels in order to avoid yielding and a possible collapse of the lower race.

The drawn kingpin rivet holds the sheet metal moving parts and the thrust bearing assembly together. It has a long inner tubular portion that extends upwards from the inner periphery of a flat base portion and may have a second tubular portion that similarly extends upwards from the outer periphery of the flat base portion but to height less than that of the inner tubular portion. This type of kingpin rivet may be mass produced by a stamping process using a progressive draw die. A blank is first stamped from a flat sheet of raw material followed by several stages that draw and reduce the inner tubular portion. Once it has achieved the desired depth and diameter, the material is held by the flat base portion and the outer tubular portion may be drawn in the same direction as the first. When configured with this outer tubular portion, the kingpin rivet is referred to herein as double drawn, otherwise it referred to as single drawn. The final progressions of the die pinch off the ends of the tubular portions to their final dimensions.

Although several commercially available materials can be used to achieve the many physical forms of a drawn kingpin rivet, producing it from an annealed 300 series stainless steel offers the same advantages as producing the caster moving parts from a tempered stainless. The severity a typical inner draw rapidly work hardens the material from the annealed state all the way up to the ¾-full hard condition in the areas where the metal moves the most. In this condition, the tensile strength of a 301 or 304 stainless will be more than three times that of the annealed condition and the modulus of elasticity will have decreased slightly. Therefore, it is possible for the hollow drawn kingpin rivet to be made from a relatively thin gauge of stainless and actually be stronger than the solid kingpins it is intended to replace. Furthermore, these material properties resemble the characteristic of a spring steel and the drawn kingpin rivet may therefore exhibit the same spring-like behavior as the caster moving parts. In the present invention, a hollow stainless drawn kingpin rivet of a given diameter replaces a solid kingpin of a smaller diameter resulting in excellent strength and highly desirable spring-like qualities that can be tuned for particular applications. Compared to simple stamped parts, a stainless steel drawn kingpin rivet requires experienced manufacturing expertise to achieve close tolerances in a thickness that ensures high strength.

Assembly of the caster is simplified by the unique shape of the drawn kingpin rivet. The hollow inner diameter of the inner tubular portion permits it to be easily held on a pin while parts from the thrust bearing assembly and the mounting plate are subsequently aligned and assembled upon it in a sandwich-like fashion. These parts may be properly located by a central aperture in each of the moving parts and the mounting plate for a clearance fit about the outer diameter of the inner tubular portion. When all the parts have been assembled, a prescribed amount of the inner tubular portion will protrude above the last part assembled which may be the mounting plate or the upper race depending on the desired configuration.

The caster assembly will be permanently retained when a curling operation is performed upon this protruding end. This operation may use a hydraulically actuated tool to cold work the material distally outwards and downwards about a smooth radius. Even though the material at this end has already been substantially cold worked, the stainless steel retains enough ductility to assume this radially elongated shape. The operation is completed when the material is curled 90 degrees and holding the caster assembly together in compression. Curling involves the controlled flow of a ductile sheet metal about a curling radius and should be distinguished from swaging, which entails the movement of a soft metal in a general direction by brute force. Like the standard kingpin that experiences a high degree of stress in the area that has been swaged, the drawn kingpin rivet experiences the highest stress in the area that has been curled. However, the drawn kingpin rivet is still stronger because the curled end portion is located on a much larger diameter than comparable standard kingpins, the curled metal is much stronger, and the smooth flow of the material about the curling radius results in a lower concentration of stress. It should be noted that swaging, or a similar operation to work the metal into the correct position, will still allow the caster assembly to be held together and retain some of the advantages described by virtue of the use of the kingpin rivet and other features.

The spring-like properties of a drawn kingpin rivet can be tuned to a greater extent than the caster sheet metal parts by varying several aspects of the geometry. In the single or double drawn configuration, adjustments can be made to the thickness of the metal, the inner diameter, and the draw depth. In the double drawn configuration, the draw depth and diameter of the outer tubular portion can also be adjusted. These parameters provide good controllability over the strength and flexural elasticity of the drawn kingpin rivet.

The drawn kingpin rivet is a leading contributor to the overall shock absorbing qualities of the present invention. This part supports the lower race either directly or indirectly through intermediary parts. Consequently, the bearing forces that act upon the lower race also act upon the drawn kingpin rivet creating a bending moment that elongates the material in the front of the caster and compresses it in the back. The longer and thinner the inner tubular portion, the more pronounced this longitudinal flexing is in response to static and dynamic loads. For a given thickness and diameter, the length of the inner draw for a single drawn kingpin rivet can be controlled by placing a spacer underneath the lower race. A double drawn kingpin rivet can eliminate the need for this additional part by having a long outer draw that also makes this portion extremely rigid. Lastly, a double drawn kingpin rivet with a short draw depth on the outer tubular portion may permit an arc of deflection to occur relative to the inner tubular portion.

However configured, the flexural elasticity of the drawn kingpin rivet may result in additional downward movement of the lower race accompanied by a corresponding rotation of the wheel chassis. Therefore, the passive shock absorption of the overall caster assembly can generally be described as a superposition of multiple deflections in the caster moving parts and the flexural elongation of the drawn kingpin rivet that translates into significant upward movement of the wheel under shock loads. This upward movement and its associated storage of shock load energy into the caster sheet metal parts substantially reduces the shock load transmitted to the supported equipment. Once the obstacle is past, the parts immediately spring back into their original positions moving the wheel back downward and releasing the stored energy.

Although the material properties of the caster sheet metal parts permit this highly desirable spring-like behavior, this passive form of shock absorption by itself is not equivalent in performance to active shock absorbing casters but may be sufficient for many applications. For reference, a preferred embodiment of the present invention can absorb approximately 65–70% of the shock load while a shock-absorbing caster absorbs approximately 95%. However, it may be possible to improve the performance of the present invention by strategically placing active shock absorbing elements into the assembly.

In summary, the present invention employs a unique combination of materials and geometry together with a novel drawn and curled kingpin rivet to arrive at a caster assembly that exhibits remarkable durability, passive shock absorption, light weight, and corrosion resistance. It can be disposed at a fraction of the cost of shock absorbing and stainless steel casters while remaining competitive with ordinary zinc plated steel casters of reasonable quality. The nature of the present invention will be more readily understood after consideration of the drawings and the detailed description of the preferred embodiment that follow.

DETAILED DESCRIPTION OF THE INVENTION

A preferred embodiment of the present invention is a caster assembly that generally comprises a mounting plate, an upper race, a wheel chassis, a lower race, and a thrust bearing assembly all permanently retained by a proximally located double drawn kingpin rivet. The thrust bearing assembly generally comprises an upper and lower set of ball bearings, a shim and spacer, and one or more o-ring seals. The caster assembly may combine these and other elements to reliably aid in the movement of heavy equipment while providing exceptional passive shock absorption, corrosion resistance, and light weight.

FIGS. 1–4 show a first embodiment of the caster assembly 10 with a double drawn kingpin in accordance with the present invention. All structural parts of the device may be manufactured as sheet metal stampings from various stainless steels. The mounting plate 20 may be formed from an annealed stainless and is generally designed to mate with and affix to the underside of a frame member (not shown). Accordingly, although the mounting plate could be any one of a variety of shapes, generally the mounting plate is rectangular or square with a flat mating surface 21 and four mounting holes 22. Parallel and internal to the mating surface may be a recessed surface 23 with a central aperture 24 that allows passage of the double drawn kingpin rivet 60.

Figure 1:
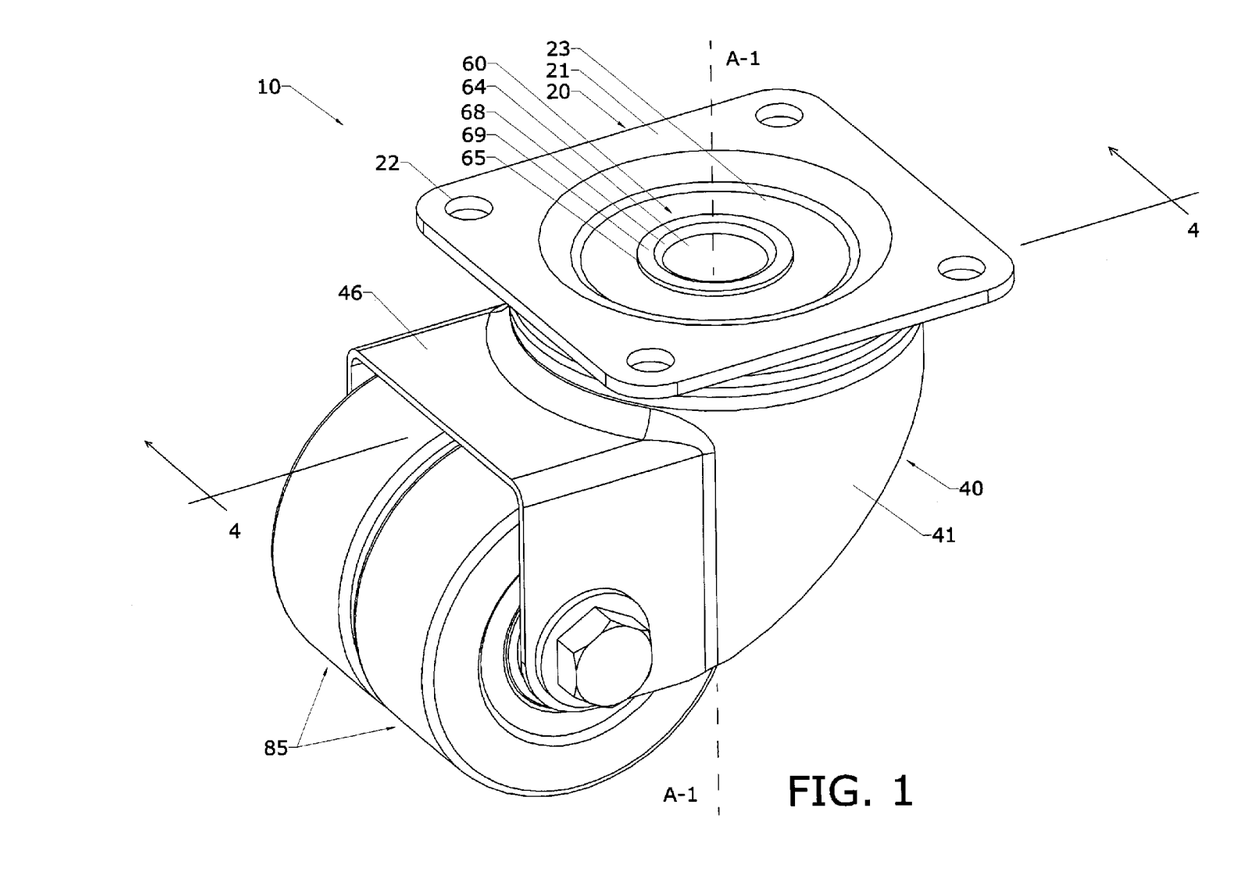
FIG. 1 is a perspective view of a first embodiment of the present invention.
Figure 2:
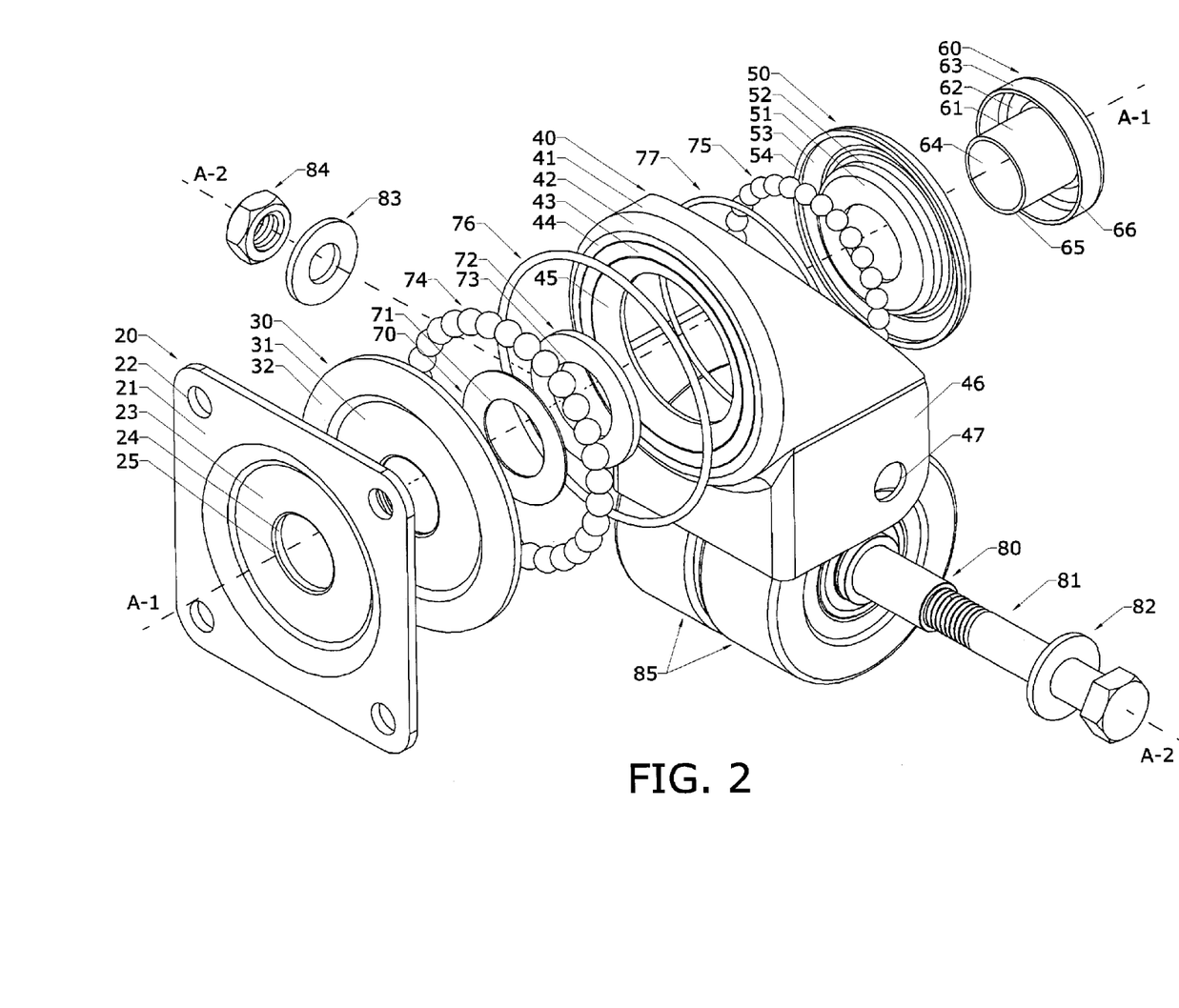
FIG. 2 is an exploded perspective view of the first embodiment looking down at the top and side of the caster assembly with a double drawn kingpin rivet shown prior to curling.
Figure 3:
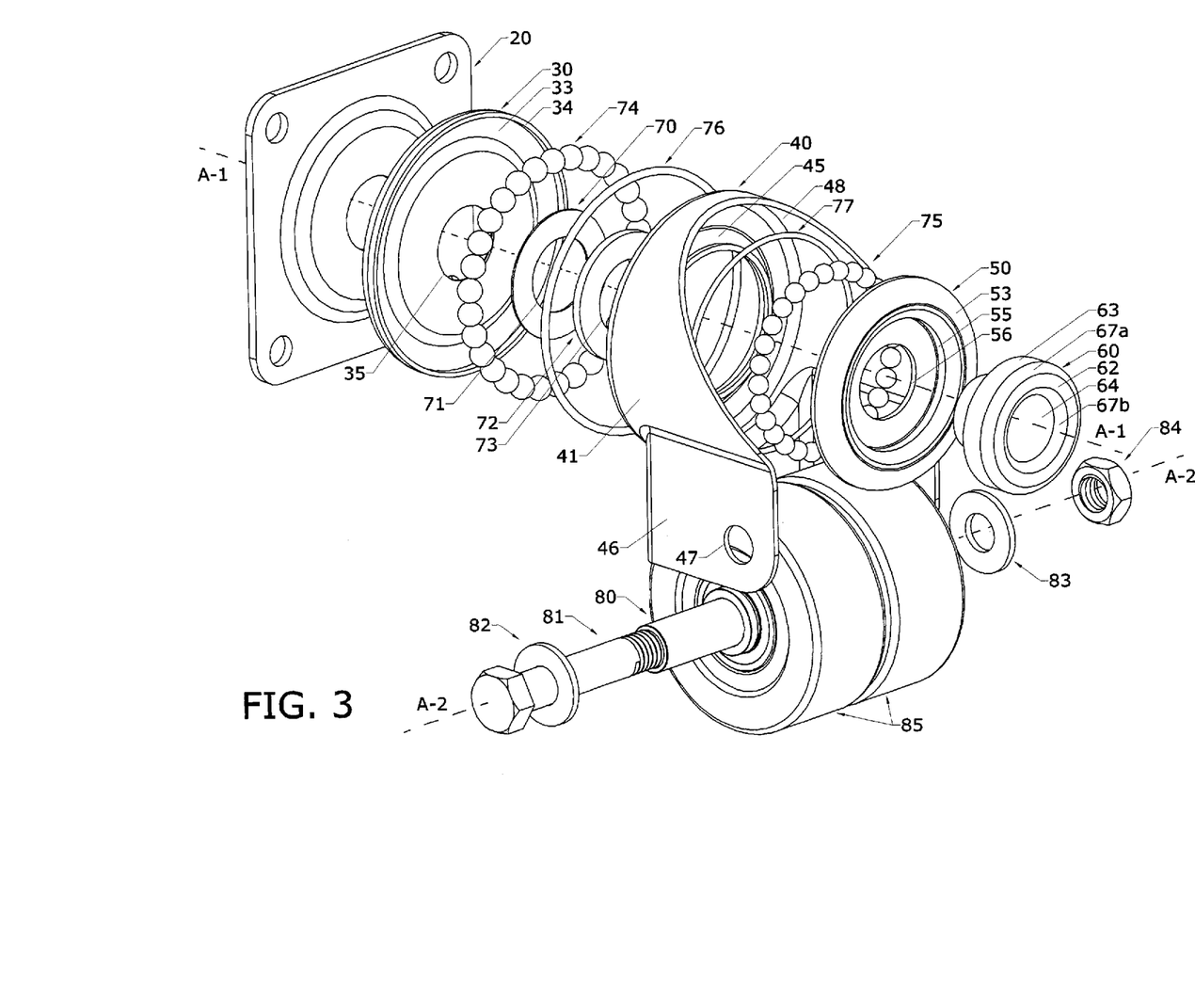
FIG. 3 is an exploded perspective view of the first embodiment looking up at the bottom and side of caster assembly with a double drawn kingpin rivet shown prior to curling.
Figure 4:
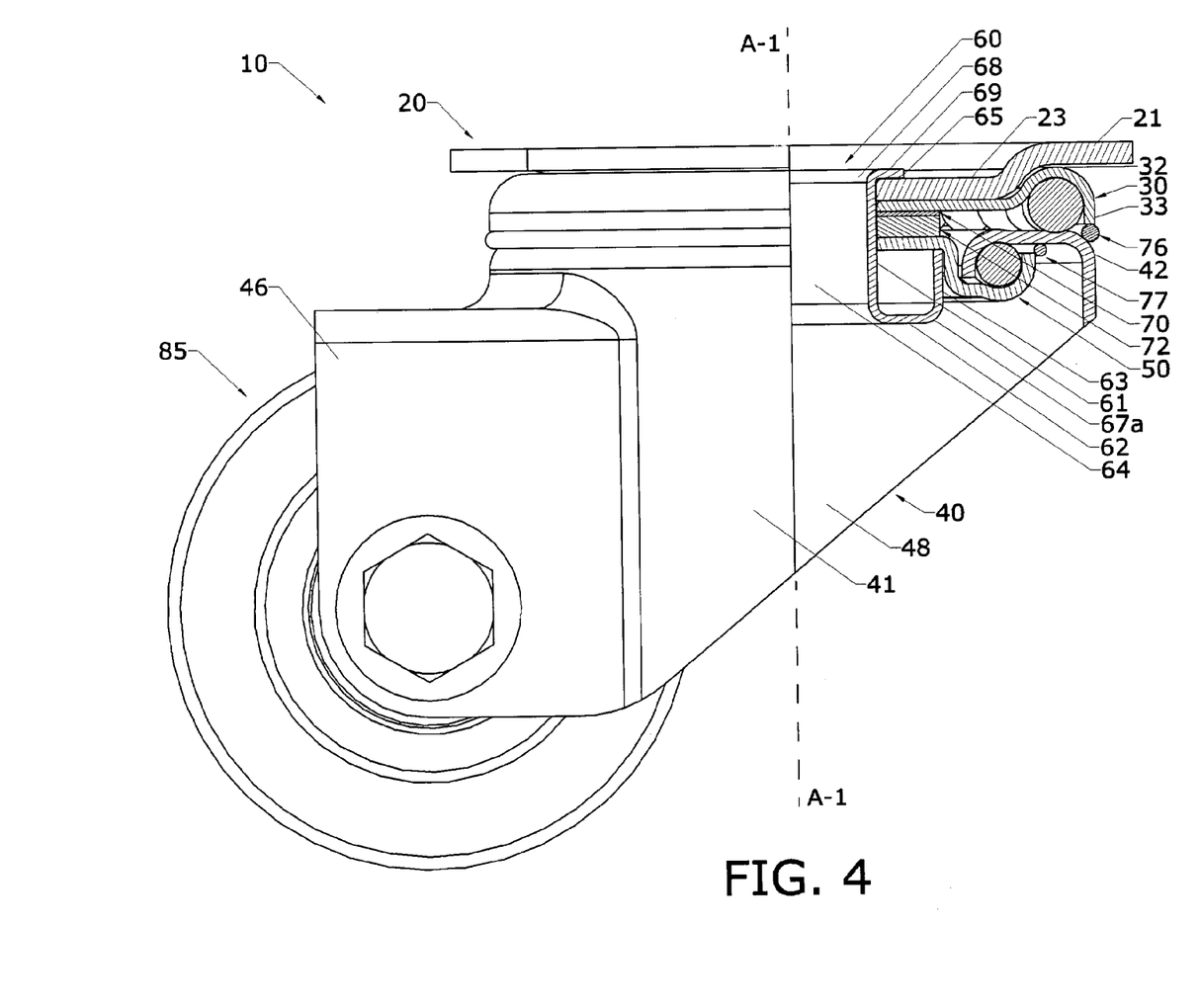
FIG. 4 is a cross-sectional side view of the present invention with a double drawn kingpin rivet taken through section 4—4 as indicated in FIG. 1.

The mounting plate together with the caster sheet metal moving parts and the thrust bearing assembly are all assembled in a sandwich like fashion (best seen in FIG. 4) about the double drawn kingpin rivet 60. The caster sheet metal moving parts contact the hardened upper and lower ball bearings 74,75 of the thrust bearing assembly. These parts include the wheel chassis 40, the upper race 30, and the lower race 50 and may be produced from a ¼ hard 301 stainless steel. Referring to FIGS. 2–4, the thrust bearing assembly provides swiveling caster means for the wheel chassis 40. The thrust bearing assembly generally comprises an upper and lower set of ball bearings 74, 75, a shim 70, a spacer 72, and an upper and lower o-ring seal 76, 77.

The wheel chassis 40, best seen in FIGS. 2–3, may have a drawn cylindrical portion 41 with a rounded surface 42 that transitions into a flat upper surface 43. A shallow upper bearing groove 44 may be coined into the flat upper surface for improved load distribution of the upper bearings. Curving peripherally inwards and downwards from the flat upper surface 43 may be a lower bearing groove 45 that is effectively cantilevered in a radial fashion from the drawn cylindrical portion 41. The lower bearings 75 occupy the interior 48 of the cylindrical portion 41 and are accommodated by the lower bearing groove 45 and a complementary bearing groove in the lower race 50. These two interlocking bearing grooves laterally constrain the swiveling wheel chassis relative to the rest of the caster assembly. Integrally extending from the cylindrical portion 41 may be a bifurcated fork protrusion 46 extending angularly downward and spaced peripherally outward from the kingpin, rivet 60. Dual wheels 85 may fit between the fork protrusion 46 and may be rotably mounted to and as part of the chassis by means of a precision ground sleeve 80, a nut 84, a bolt 81, and washers 82, 83 through a hole 47 in the wheel chassis to rotate about an axis of rotation A-2. The wheels are positioned such that this wheel axis of rotation A-2 (through the center of bolt 81) is offset from center of the wheel chassis swivel rotation about longitudinal axis A-1.

When the wheels 85 encounter an obstacle, an instantaneous shock load is generated from the point of impact with a magnitude dependant upon the velocity and the caster load just prior to impact. To the extent that the shock load does physical work on the caster itself, only a fraction of the overall energy will be transferred to the supported equipment. For instance, work is done on a soft or elastomeric wheel when it deforms on contact with the obstacle. Similarly, shock may be absorbed through passive deflections of the caster sheet metal parts if the material is strain tolerant. By capitalizing on the material properties of ¼ hard 301 tempered stainless in the work hardened condition, it is possible to have caster moving parts that operate at far higher levels of stress, are capable of significant strain prior to yield, and are very light weight. These qualities simply cannot be achieved in parts produced from low carbon steel or an annealed stainless.

Regardless of the load conditions, most of the bearing load will be borne by the upper race 30. It is radially symmetric with a flat inner portion 31 circumscribed by a bearing groove 32. As seen in FIG. 4, a circular lip 34 may extend downwards from the periphery of the upper race for snug nesting of the upper o-ring 76 between this edge and the rounded surface 42 of the wheel chassis. In the upwards direction, the upper race is constrained by the opposing surface of the recessed surface 23 of the mounting plate 20. The nature of this interface also determines the cantilever length of the upper bearing groove 33. Accordingly, clearance between the apex 32 of the bearing groove 33 and the opposing surface of the mating surface 21 may permit a small stress induced deflection under the rated static load and larger deflections under dynamic shock loads.

The lower race 50 is also radially symmetric and may have a flat inner portion 51 and a cylindrically drawn portion 52 circumscribed by a radially cantilevered bearing groove 53. A circular lip 54 enhances structural rigidity and allows the lower o-ring seal 77 to nest between it and the surface of the wheel chassis opposing the flat upper surface 43 (FIG. 4). The interior cavity 55 of the drawn cylindrical portion 52 may accommodate the outer tubular portion of the double drawn kingpin. The lower race is seated when the bottom surface of the flat inner portion 51 contacts the outer end 66 of the kingpin rivet 60. In this configuration, the cantilever length is the difference between the lower bearing radius and the radius of the outer tubular portion 63 of the kingpin rivet 60.

The upper and lower races are separated by the shim 70 and spacer 72 of the thrust bearing assembly and may be sealed by the upper and lower o-rings 76, 77. The spacer 72 may serve to provide gross bearing separation which is refined by varying the thickness of the shim 70 for close tolerance control. The primary function of the o-rings are to provide a seal against environmental contamination, however, they also enhance the aesthetics of the overall assembly and provide a degree of swivel resistance. This resistance helps ensure smoother swiveling and damps undesirable oscillations of the wheel chassis during movement.

Apart from the swiveling wheel chassis 40, all of the sheet metal parts including the mounting plate 20, the upper race 30 the shim 70, the spacer 72, and the lower race 50 are naturally aligned and located by respective central apertures 24, 35, 71, 73 and 56 that clearance the inner tubular portion 61 of the double drawn kingpin. This part forms the primary structural element of the caster assembly and may be formed by a progressive draw die from an annealed stainless steel such as 301 or 304. The double drawn kingpin rivet has a deep drawn inner tubular portion 61 that extends upwards from the inner periphery of a flat base portion 62 and an outer tubular portion 63 that similarly extends upwards from the outer periphery of the flat base portion and is concentrically aligned with the first portion. Generous radii 67a, 67b circumferentially connect the inner and outer tubular portions to the flat base portion 62 for ease of manufacture and improved stress distribution.

Figure 5A:
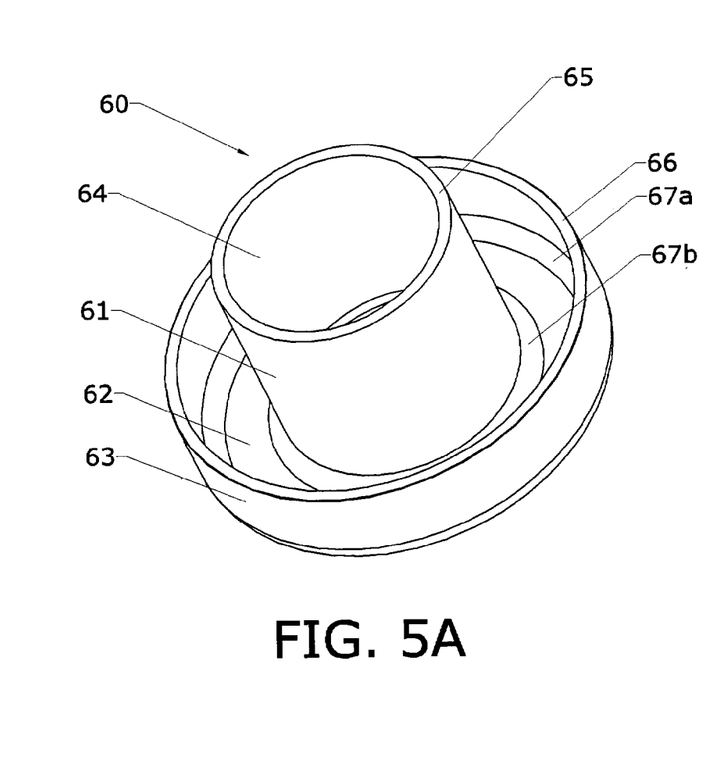
FIG. 5A is a close-up perspective view of a double drawn kingpin rivet shown prior to the curling process.
Figure 5B:
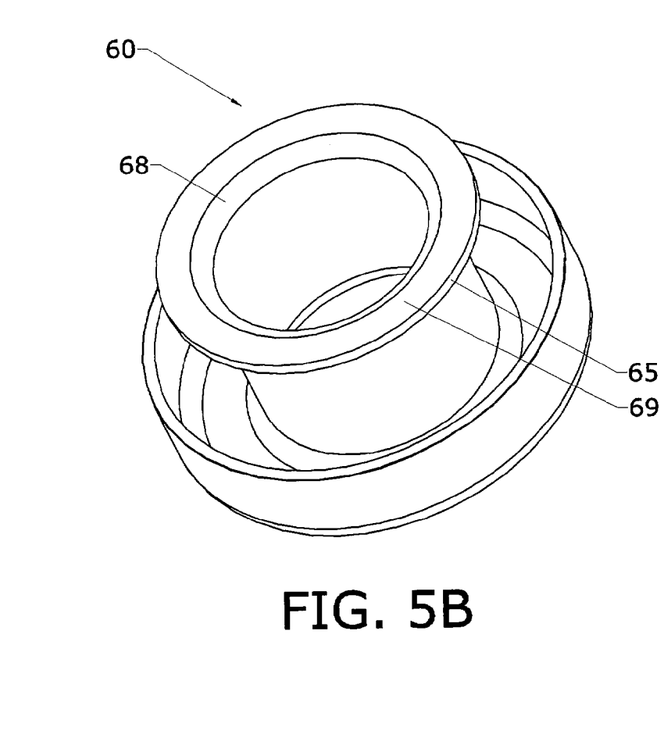
FIG. 5B is a close-up perspective view of a double drawn kingpin caster rivet shown after the curling process.
Figure 7A:
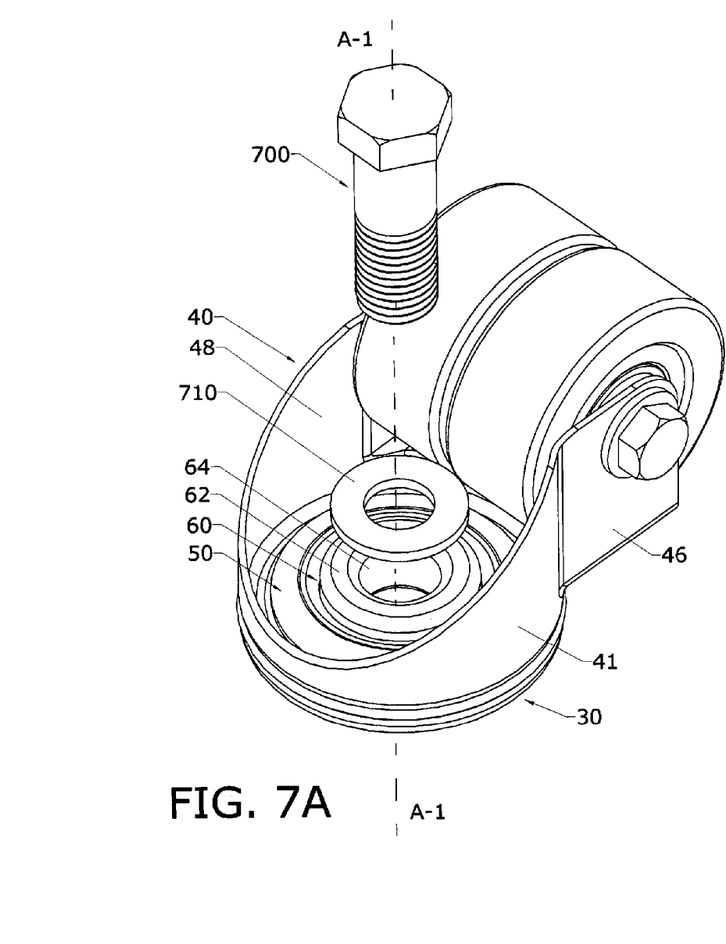
FIG. 7A is an exploded perspective view of a third embodiment looking down at the bottom and side of the caster assembly.
Figure 7B:
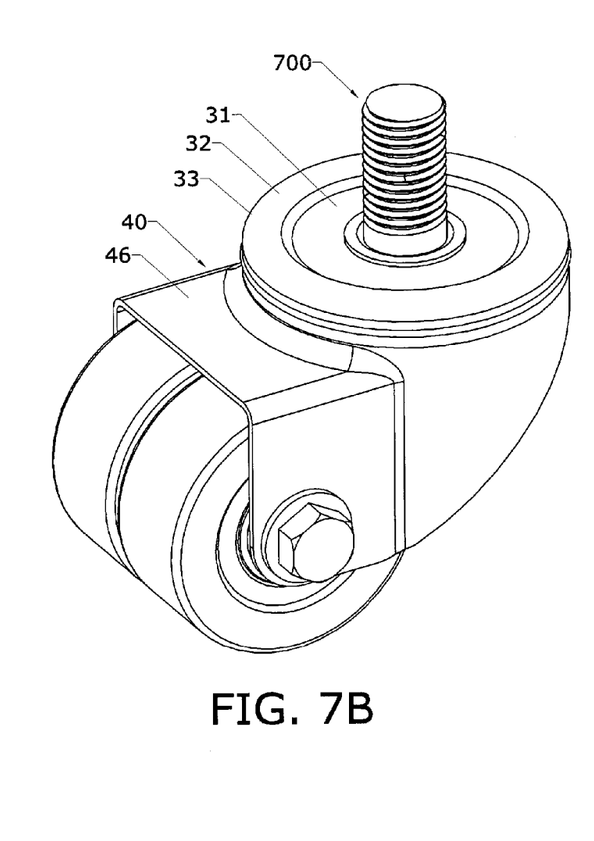
FIG. 7B is perspective view of the third embodiment looking down at the top and side of the caster assembly.

As it is cold worked from flat strip in the annealed condition, the severe draws of the double drawn kingpin rivet 60 will quickly and substantially work harden the annealed material to achieve a tensile strength that is more than three times that of a low carbon steel. In the process, the double drawn kingpin rivet acquires the same spring-like properties of the more moderately formed sheet metal moving parts made from a tempered stainless steel. As seen in FIGS. 5A–B, several geometrical parameters including the diameters of the inner and outer tubular portion 61, 63, their associated draw depths, and the thickness of the material may be tuned to control the flexural strength and elasticity of the part while leaving a generous safety factor over the rated load. The most critical parameter as far as strength is concerned is the inside diameter 64 of the inner tubular portion. It is convenient for this diameter to correspond with dimensional increments of standard inch size fasteners such that a commercially available fastener may pass through the hollow center of the kingpin rivet as an additional practical benefit (FIGS. 7A–B).

In a preferred embodiment, the outer tubular portion of the double drawn kingpin rivet directly supports the lower race 50 so that the base portion 62 is adjacent to, but not necessarily in contact with, the lower race. In this configuration, the draw depth of the outer tubular portion is equal to the draw depth of the inner tubular portion minus the cumulative thickness of the mounting plate 20, upper race 30, shim 70, spacer 72, and lower race 50, as seen in FIG. 4. In addition, a predetermined length of the inner tubular portion protrudes above the flat recessed surface 23 of the mounting plate 20 prior to the final curling process. For reference, the draw depth of the inner or outer tubular portion is defined as the distance between the flat base portion 62 and the inner or outer ends 65, 66 respectively. These ends are created by the last progressions of the die that pinch off extraneous material at the end of the draw. Methods of drawing stainless steel material are well-known to those of ordinary skill in the art, although such methods when applied to more complex forms and materials, such as a kingpin rivet 60, require a high degree of experience and expertise in die design.

The curling process may be performed by a hydraulic press that precisely guides a curling die with several tons of force onto the inner end 65 of the double drawn kingpin rivet. This action forces the material to flow distally outwards and downwards about the curling radius 68 until it is compressed against the recessed upper surface 23 of the mounting plate 20 as seen in FIG. 4 or 5B. A slight radius 25 may be coined into the mounting plate or uppermost part to promote the smooth flow of the material as seen in FIG. 2. The completed curling process yields an annular lip 69 that extends radially outwards from the inner tubular portion 61 forming a surface that is parallel to the recessed surface. The smooth flow of metal about this radius combined with the annular lip provides riveting means that bind the sheet metal parts tightly together in compression between the mounting plate 20 and the lower race 50. The final assembly obtains a level of strength that is superior to ordinary kingpin casters and capable of handling severe static and dynamic loads.

The passive shock absorbing qualities of a caster constructed in this fashion arise from the geometry of the parts and the ability of the material to withstand strain in a spring like fashion. In a collision with an obstacle, a shock load on top of the static load will be transmitted from the hole 47 in the rigid fork protrusion 46 of the wheel chassis to the upper and lower races in a proportion determined by mechanical physics. Like an electrical current that seeks the path of least resistance, the transient shock load flows to where it can be most readily absorbed. A portion may be absorbed by an upwards deflection of the upper race 30 about an arc that extends across the back of the caster. Over this brief duration of time, the deflection may fully consume the clearance between the apex 32 of the upper bearing groove 33 and surface opposing the mounting surface 21 (FIG. 4). In the wheel chassis, the structural rigidity of the fork protrusion 46 and the drawn cylindrical portion 41 offers very little in the way of shock absorption, however, the radially cantilevered lower bearing groove 45 may deflect upwards in conjunction with a downwards deflection of the interlocked bearing groove 53 of the lower race. This coupled movement of the lower bearing grooves combined with the movement of the upper race represents work done on the caster moving parts and the partial absorption of the shock load.

The double drawn kingpin rivet 60 is perhaps the principal shock-absorbing element in the caster assembly. In response to the forces acting upon the lower race, a bending moment is produced that elongates the material of the inner tubular portion 61 in the front of the caster and compresses it in the back. This longitudinal flexing of the kingpin rivet is more pronounced as the geometry of the inner tubular portion becomes longer and thinner and the stainless material is work hardened toward full hardness.

In a preferred embodiment, the draw depth of the inner tubular portion 61 is approximately double that of the outer tubular portion 63 for good flexural elasticity that results in additional downward movement of the lower race 30 about the front of the caster under shock loads. Superimposing this movement upon the stress-induced deflections of the upper race 30, lower race 50, and wheel chassis 40 results in substantial passive shock absorption accompanied by significant upwards movement of the wheel. Once the obstacle is past, the parts immediately spring back into their original positions moving the wheel back downward and releasing the stored energy.

Figure 6:
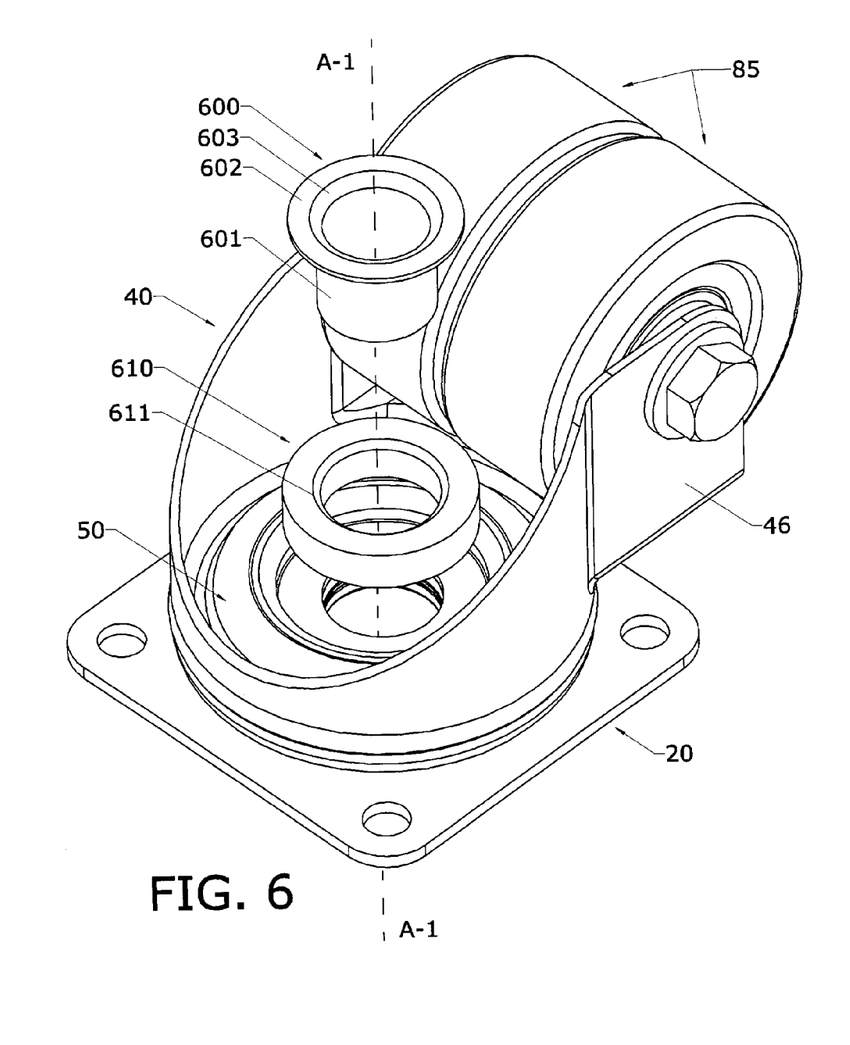
FIG. 6 is an exploded perspective view of a second embodiment of the caster assembly looking down at the bottom and side of the caster assembly with a single drawn kingpin rivet shown prior to curling.

As seen in FIG. 6, a second preferred embodiment of the caster assembly is held together by a curled single drawn kingpin rivet 600 that lacks the outer tubular portion 63 of the double drawn kingpin rivet 60. In an effort to preserve flexural elasticity, a thick spacer 610 may be inserted after the lower race 50 so that long draw of the inner tubular portion 601 is maintained. Although the flat base portion 602 is still adjacent to the lower race 50, it will have direct interface with the spacer rather than the bottom of the lower race 50. A generous chamfer 611 on the spacer 610 may be necessary to clearance the draw radius 603 of the single drawn kingpin rivet.

As seen in FIGS. 7A–7B a third embodiment of the caster assembly lacks a mounting plate altogether. Here, the draw depth of the inner tubular portion 61 of the kingpin rivet 60 is reduced by the thickness of the mounting plate and the inner end 65 is curled distally outwards and downwards until it is compressed against the top of the flat inner portion 31 of the upper race 30. Attachment to equipment is facilitated by inserting a commercially available fastener 700 and a washer 710 through the hollow inside diameter 64 of the kingpin rivet 60. Such a second embodiment may require additional constraints upon the upper race 30 such as 360-degree contact between the apex 32 of the bearing groove 33 and the frame member (not shown). This second embodiment can effectively become a stem caster of any length for far less cost than a traditional stem caster that uses a custom screw machined part for each length of stem. Standard fasteners have the additional advantage that they can be purchased economically with tensile strengths that far exceed that of the low carbon steels used for most caster stems.

Figure 8:
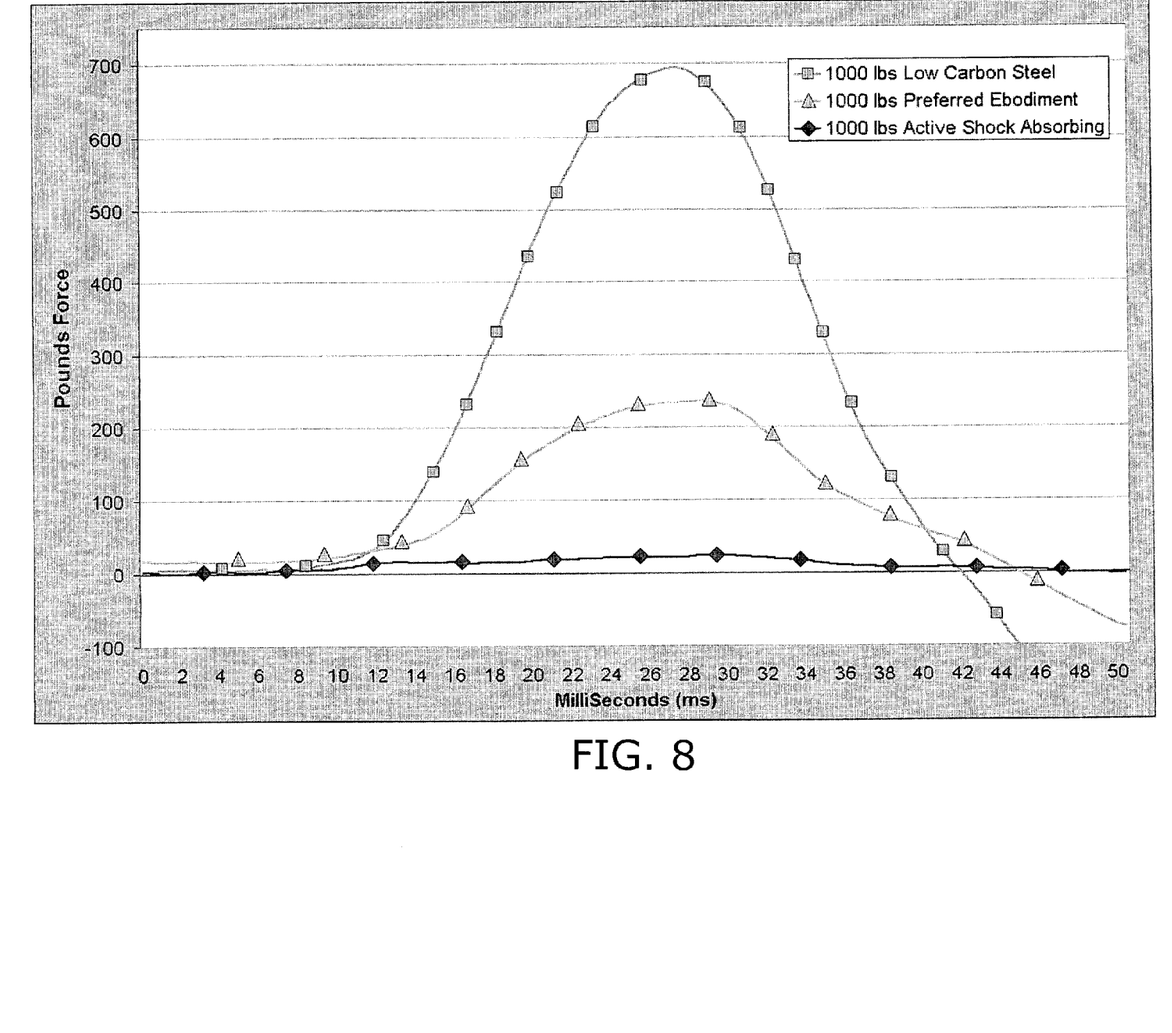
FIG. 8 is a graphical depiction of actual testing data that compares the shock absorbing capacity of a preferred embodiment to that of a low carbon steel caster and a shock-absorbing caster.

FIG. 8 shows the results of shock testing performed on a particular embodiment of the present invention in comparison to a low carbon steel caster and a shock absorbing caster. This particular embodiment was engineered to have a load rating of 1000 lbs and it has the material and geometrical properties outlined in Table 1. The testing apparatus comprised of a twenty-inch drum wheel turning under electric motor control at 3 mph with a 2.5 mm obstacle fastened across the outer diameter. The casters were affixed to the end of a hydraulic cylinder under a constant regulated pressure that equated to a load of 800 lbs. Vertical shock impulse loads were captured by connecting a sensitive pressure transducer

TABLE 1

Geometrical Parameters of a 1000 lbs. Embodiment

| Mounting Plate 20 | |
|---|---|
| Material | 1/4 Hard 301 Tempered Stainless |
| Thickness | 0.125 in. |
| Upper Race 30 | |
| Material | 1/4 Hard 301 Tempered Stainless |
| Thickness | 0.060 in. |
| Bearing Diameter | 3.00 in. |
| Cantilever Length | 0.438 in. |
| Clearance* | 0.015 in. |
| Wheel Chassis 40 | |
| Material | 1/4 Hard 301 Tempered Stainless |
| Thickness | 0.075 in. |
| Bearing Diameter | 2.375 in. |
| Cantilever Length | 0.350 in. |
| Wheel Offset | 2.10 in. |
| Lower Race 50 | |
| Material | 1/4 Hard 301 Tempered Stainless |
| Thickness | 0.075 in. |
| Bearing Diameter | 2.375 in. |
| Cantilever Length | 0.350 in. |
| Double Drawn Kingpin Rivet 60 | |
| Material | 304 Annealed Stainless |
| Thickness | 0.050 in. |
| Inner Depth | 0.950 in. |
| Inner Diameter | 0.930 in. |
| Outer Depth | 0.425 in. |
| Outer Diameter | 1.675 in. |

*Clearance refers to the distance between the apex of the bearing groove 32 and the mounting plate 20.

to an electronic oscilloscope and monitoring the cylinder pressure. The shock transmitted from the caster on impact causes a sudden and substantial rise in cylinder pressure that is directly proportional to the shock load. FIG. 8 displays the shock load versus the time in milliseconds With a zero force level representing the 800 lbs. load just prior to impact. The three casters were outfitted with the same wheel material, wheel diameter, and wheel bearings for the best possible comparison. It is evident that the 1000 lbs. preferred embodiment reduces the transmitted shock load by 66% in comparison to a 1000 lbs. low carbon steel caster. However, it does not perform as well as the active shock-absorbing caster that reduced the shock by approximately 96%.

Figure 9:
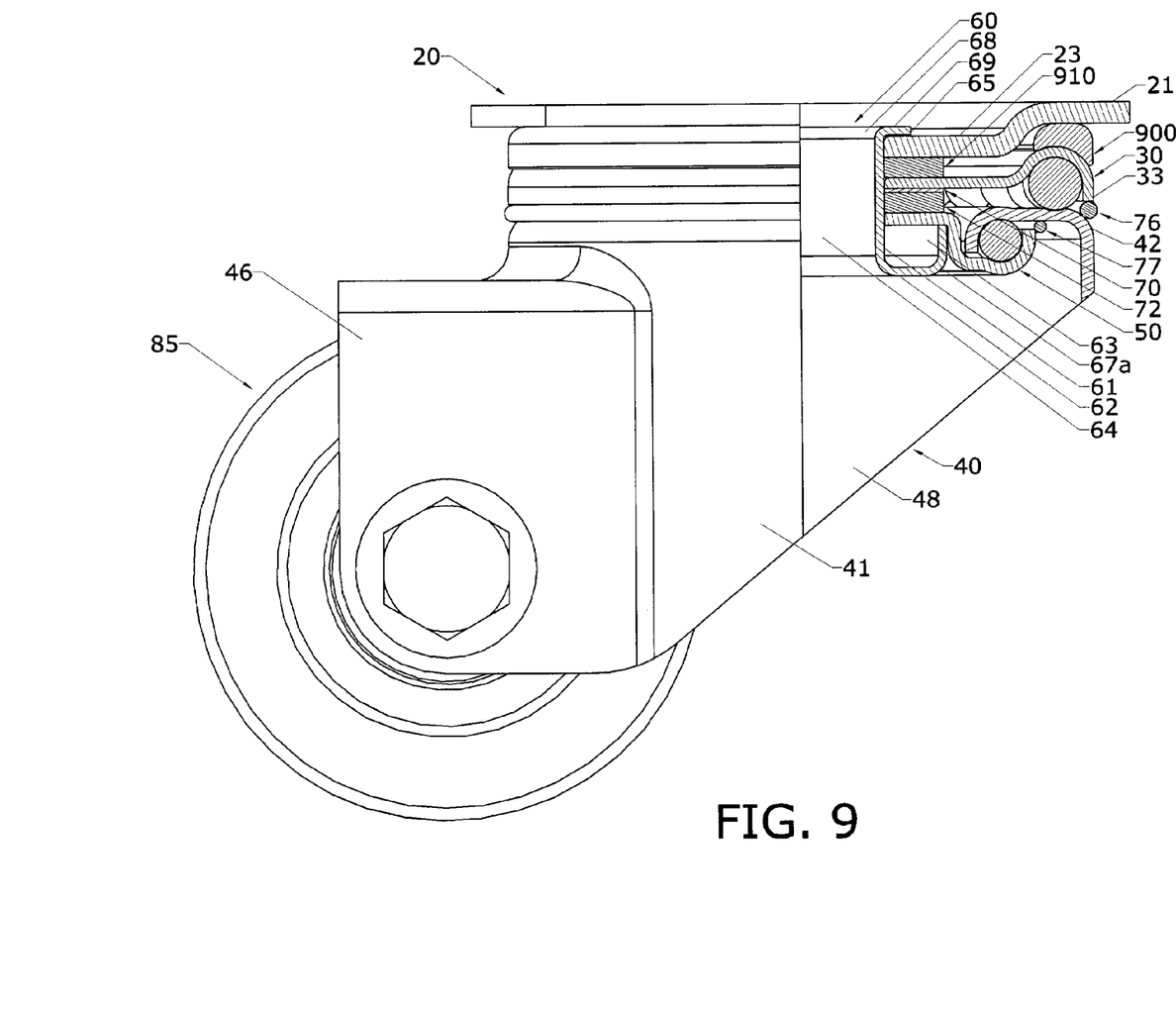
FIG. 9 is a cross-sectional side view of a fourth embodiment of the present invention with a double drawn kingpin rivet taken through section 4—4 as indicated in FIG. 1.

It was also observed during testing that the 0.015 in. clearance between the apex 32 of the bearing groove 33 and the opposing surface of the mating surface 21 was entirely consumed by deflection under the initial 800 lbs. load. This indicates that upper race deflections played no role in the passive shock absorbing performance of the 1000 lbs. preferred embodiment. Increasing the thickness of the upper race would facilitate an additional shock absorbing contribution from the upper race at the expense of higher part cost. Alternatively, as shown in a fourth embodiment (FIG. 9), an elastomeric disc 900 could be inserted between the apex of the upper raceway 32 and the mounting plate and its durometer could be varied to control the amount of additional support and thereby deflection. A spacer 910 may be necessary to move the mounting plate upwards in order to accommodate a disc of reasonable thickness and its outer diameter may be varied to change the effective cantilever length of the upper race. As shown in FIG. 9, the spacer 900 may also be chosen to be the same spacer as the thrust bearing spacer 72.

Thus, it is evident that a caster assembly bound by a unique drawn kingpin rivet and comprised of geometrically configured moving parts made from tempered stainless steel can provide excellent strength and passive shock absorption in addition to high corrosion resistance and light weight. While the present invention has been shown and described with reference to the foregoing preferred embodiment and a caster application, it will be apparent to those skilled in the art that changes in form, connection, and detail may be made therein without departing from the spirit and scope of the invention as defined in the appended claims:

I claim:

1. A caster assembly comprising:
    A kingpin rivet comprising:
        a drawn metal inner tubular portion formed unitarily with and extending substantially perpendicularly from a metal base;
        the inner tubular portion further defining a end opposite the metal base said end adapted for additional working;
        a drawn metal outer tubular portion, substantially surrounding the inner tubular portion formed unitarily with and extending substantially perpendicularly from the metal base;
        and wherein the inner tubular portion extends a first distance from the base portion and the outer tubular portion extends a second distance from the base portion, and the first distance is greater than the second distance;
    A wheel chassis defining a first aperture adapted to accept the inner tubular portion;
    An upper race defining a second aperture adapted to accept the inner tubular portion;
    A lower race defining a third aperture adapted to accept the inner tubular portion; and
    A thrust bearing assembly defining a fourth aperture adapted to accept the inner tubular portion;
    wherein the wheel chassis and thrust bearing assembly are positioned between the upper race and lower race, and the inner tubular portion is inserted through the first, second, third and fourth apertures; and wherein the metal base is adjacent to the lower race and the end is worked to hold the wheel chassis, upper race, lower race and thrust bearing assembly compressively in operable relation.

2. The caster assembly of claim 1 wherein the first distance is approximately twice that of the second distance.

3. The caster assembly of claim 1 further comprising:

A mounting plate defining a fifth aperture adapted to accept the inner tubular portion, and positioned adjacent to the upper race, and wherein the inner tubular portion is inserted through the fifth aperture, whereby the mounting plate is held in operable relation to the wheel chassis and thrust bearing assembly.

4. The caster assembly of claim 3 wherein an elastomeric disc is positioned between the upper race and the mounting plate.

5. The caster assembly of claim 1 further comprising a fastener of selected length, and wherein the inner tubular portion defines an interior adapted, and the length of the inner tubular portion is selected, to receive the fastener, and wherein the fastener is received into the interior of the inner tubular portion and extends beyond the end of the inner tubular portion.

6. The caster assembly of claim 1 wherein the kingpin rivet comprises 301 stainless steel in a ¼ hard temper.

7. The caster assembly of claim 1 wherein the kingpin rivet comprises tempered stainless steel.

8. The caster assembly of claim 1 wherein the kingpin rivet comprises 300 series stainless steel.

9. The caster assembly of claim 1 wherein the end of the inner tubular portion is curled.

10. The caster assembly of claim 1 wherein the kingpin rivet, upper race, lower race, and wheel chassis comprise 301 stainless steel in a ¼ hard temper.

11. The caster assembly of claim 1 wherein the kingpin rivet, upper race, lower race, and wheel chassis comprise tempered stainless steel.

12. The caster assembly of claim 1 wherein the kingpin rivet, upper race, lower race, and wheel chassis comprise 300 tempered stainless steel.

* * * * *